Figure 5:
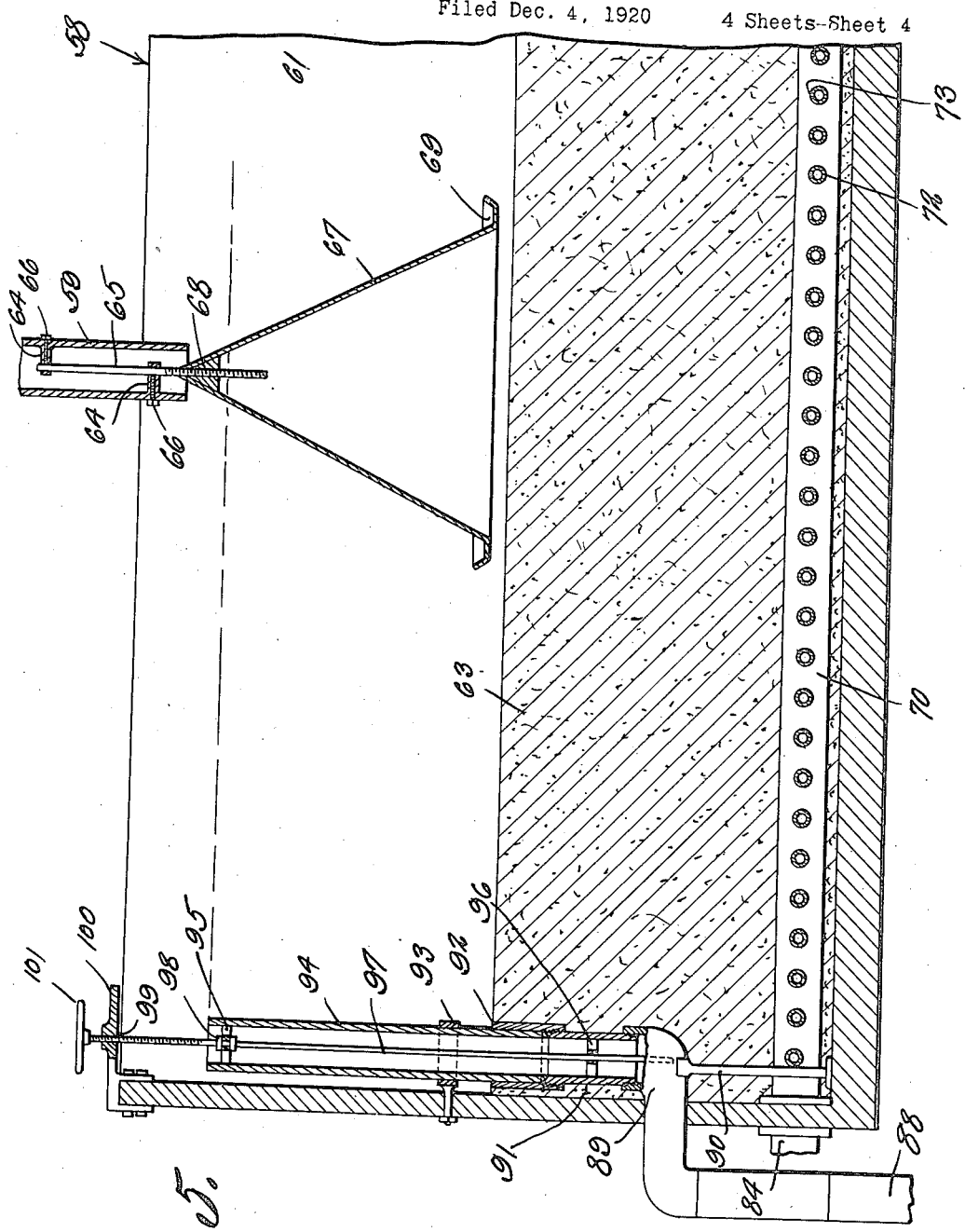

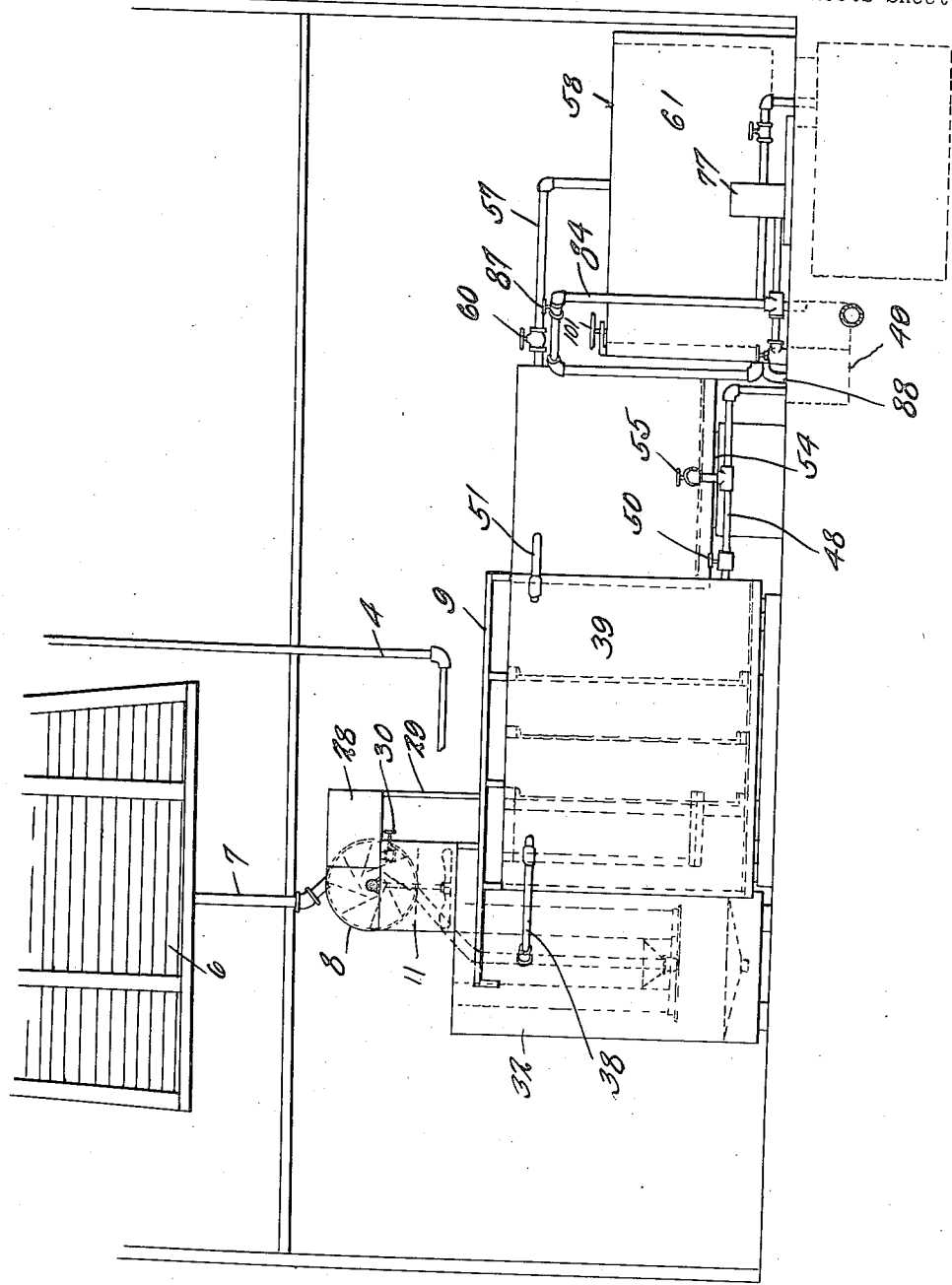

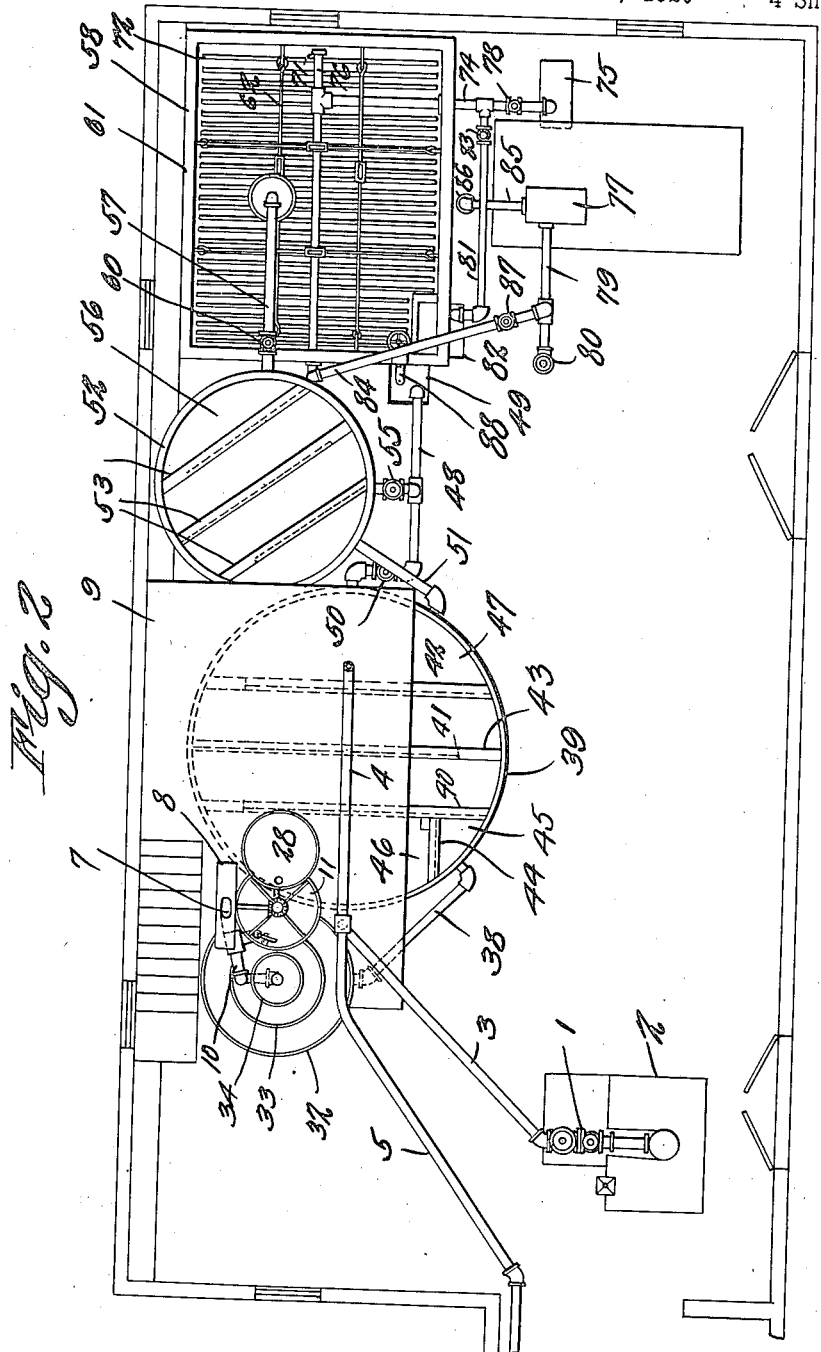

March 25, 1924.
H. W. GIBSON
1,488,041
WATER PURIFYING APPARATUS
Filed Dec. 4, 1920   4 Sheets-Sheet 3
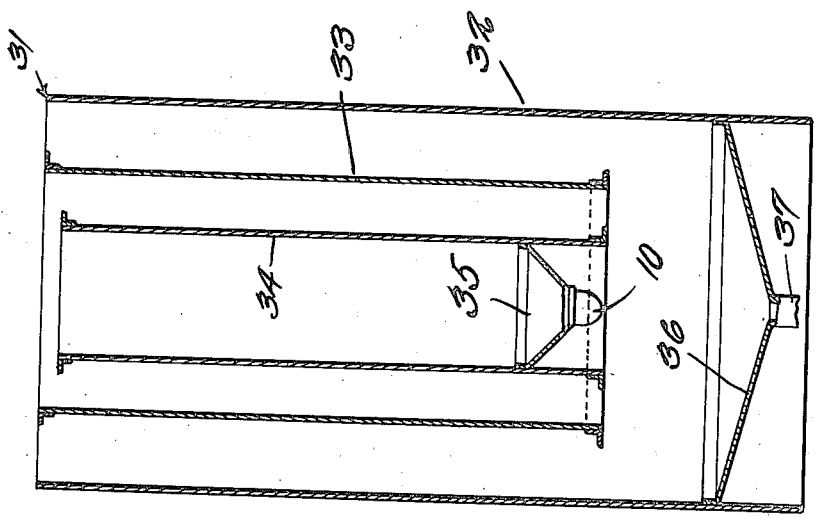
Fig. 4.
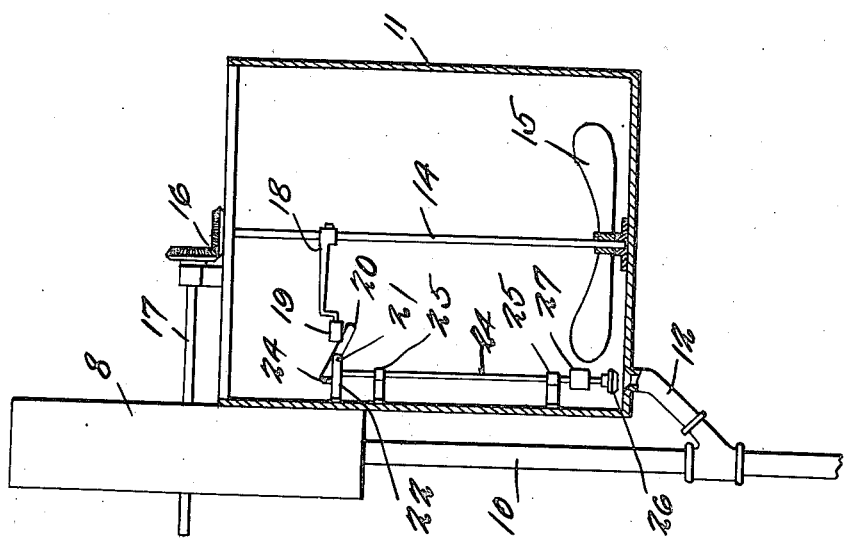
Fig. 3.
Inventor,
H. W. Gibson
By Ashrow & Co.
Attorneys.

March 25, 1924.

H. W. GIBSON

WATER PURIFYING APPARATUS

Filed Dec. 4, 1920 4 Sheets-Sheet 4

1,488,041

Inventor,
H.W. Gibson
By C.A.Snow&Co.
Attorneys.

Patented Mar. 25, 1924.

1,488,041

UNITED STATES PATENT OFFICE.

HARRY W. GIBSON, OF WELLSTON, OHIO.

WATER-PURIFYING APPARATUS.

Application filed December 4, 1920. Serial No. 428,366.

*To all whom it may concern:*

Be it known that I, HARRY W. GIBSON, a citizen of the United States, residing at Wellston, in the county of Jackson and State of Ohio, have invented a new and useful Water-Purifying Apparatus, of which the following is a specification.

The device forming the subject matter of this invention is adapted to be used for purifying water, and one object of the invention is to provide novel means whereby a chemical may be mixed and mingled with the water. Another object of the invention is to improve the filter. A further object of the invention is to provide novel means for effecting a settling of the water, a slow surface current being permitted whilst the settling operation is going on.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in side elevation, a device constructed in accordance with the invention; Figure 2 is a top plan; Figure 3 is an elevation showing the water wheel and the chemical tank, the tank appearing in section; Figure 4 is a vertical section showing the receiver into which the mechanism depicted in Figure 3 discharges; Figure 5 is a vertical section taken through the filter, parts being broken away and parts appearing in elevation.

The nature of the device is such that the operation may be set forth along with the description of the structure.

The water to be treated may be derived from any source. In Figure 2, a pump 1 is employed for drawing the water from a well 2, the water being discharged through a branch 3 into a pipe 4. Noting the point at which the reference character 5 is applied in Figure 2, it will be obvious that there may be as many branches, pumps and wells as is considered expedient. The pipe 4 discharges into an aerator 6 (Figure 1). From the aerator 6, the water flows into the casing of a water wheel 8 which may be located above a platform 9. The water flows from the casing of the wheel 8 through a pipe 10 (Figure 3).

A mixing tank 11 (Figure 3) is mounted on the platform 9 and has an outlet 12 communicating with the pipe 10 which leads from the water wheel 8. A receptacle 28 is supported at 29 on the platform 9, the water wheel 8 being carried, if desired, by the mixing tank 11, as indicated in Figure 3. The chemical which is to be added to the water, is stored in the receptacle 28 and flows into the mixing tank 11, the flow of the chemical being controlled by a valve 30, shown in Figure 1.

A shaft 14 is journaled in the tank 11 and carries a beater 15, the shaft and the beater constituting an agitator. The upper end of the shaft 14 is connected by beveled pinions 16 or in any other desired way, to the shaft 17 of the water wheel 8. A laterally extending arm 18 is secured to the agitator shaft 14 and is provided at its outer end with an enlargement 19 adapted to cooperate with a lever 20, fulcrumed at 21 on a bracket 22 extended inwardly from the mixing tank 11. The outer end of the lever 20 is loosely pivoted to a plunger 24, mounted to reciprocate vertically in guides 25 carried by the tank 11. The plunger 24 is supplied at its lower end with a valve 26 adapted to seat in the outlet 12 of the mixing tank 11. In order to secure a prompt seating of the valves 26, the plunger 24 carries a weight 27.

The pipes 7 and 10 constitute a conduit, wherein is interposed a motor, represented by the water wheel 8. The water, traversing the pipes 7 and 10 operates the motor or water wheel 8 motion being transmitted to the shaft 17, the shaft 17 driving the shaft 14 by way of the beveled pinions 16. The beater 15 is operated and effects a thorough mixing of the chemical in the tank 11. Each time that the enlargement 19 of the arm 18 on the shaft 14 passes the lever 20, the lever is tilted on its fulcrum, 21, the rod 24 being raised, along with the valve 26, the outlet 12 of the tank 11 being opened momentarily. At each rotation of the shaft 14, therefore, a small amount of chemical is delivered through the outlet 12, into the pipe 10 to mix with the water traversing the pipe. The amount of chemical delivered depends upon the speed with which the water wheel 8 is operated, and the speed at which the water wheel is operated, depends upon the amount of water traversing the pipes 7 and 10. The ratio between the water and the chemical is kept practically constant, in view of the construction and the operation above set forth.

The numeral 31 denotes a receiver (Figure 4) comprising a shell 32, a tubular outer baffle 33 within the shell and a tubular inner baffle 34 within the outer baffle 33. The inner baffle 34 has a funnel-shaped bottom 35. The pipe 10 enters the receiver 31 and communicates with the bottom 35 of the baffle 34. The baffle 34 is of less height than the baffle 33. The shell 32 carries a funnel-shaped base 36 having an outlet 37.

The water and chemical, proceeding from the pipe 10 enters the inner tubular baffle 34, through the bottom 35. The mixture flows upwardly through the baffle 34, downwardly between the baffle 34 and the baffle 33, upwardly between the baffle 33 and the shell 32 and outwardly through a pipe 38 shown in Figures 1 and 2. Owing to the fact that water and the chemical are compelled to move upwardly and downwardly, by a sinuous path in the receiver 31, a thorough mixture of the water and the chemical is effected. When it is desired to drain away the sediment in the receiver 31, such a result may be brought about by opening the outlet 37.

The numeral 39 designates a settling tank, having any desired number of partitions 40, 41 and 42 extended across the tank and upwardly from the bottom thereof. In one end of the partition 41 there is a notch 43, the partitions 40 and 42 having similar notches, located at those ends of the partitions 40 and 42 which are remote from the notch 43. A wall 44 extends between the partition 40 and the shell of the settling tank 39, the wall defining compartments 45 and 46. The pipe 38 communicates with the compartment 45.

The water flowing from the receiver 31, enters the compartment 45 through the pipe 38 and flows over the wall 44 into the compartment 46. The water, thence, passes between the partitions 40 and 41, through the notch in the partition 40, the water flowing into the space between the partitions 41 and 42, through the notch 43, the water passing into the compartment 47 between the partition 42 and the shell of the tank, through the notch in the partition 42. The flow of the water is arrested in the settling tank 39, but there is a slow surface current, back and forth, between the partitions 40, 41 and 42. The sediment sinks to the bottom of the settling tank 39 and may be drawn off into a sink 49, through a pipe 48 under the control of a valve 50.

From the compartment 47 of the settling tank 39, the water flows through a pipe 51 to a settling tank 52 having partitions 53 constructed like the partitions 45, 46 and 47 of the settling tank 39. The operation of the settling tank 52 is the same as that of the settling tank 39, and there may be any desired number of settling tanks. The sediment in the settling tank 52 is drawn off through a branch 54 into the pipe 48, the branch having a valve 55.

The water, flowing in a surface current through the settling tank 52, passes from the last compartment 56 of the settling tank into a pipe 57 provided with a valve 60. The pipe 57 has a depending end 59 (Figure 5) discharging into a filter 58.

The filter 58 comprises a box-like body 61 which may be reinforced by tie rods 62 (Figure 2). In the bottom of the body 61 is located a filter bed 63, which may be made of any desired material. The end 59 of the pipe 57 is provided with internal lugs 64, wherein a stem 65 is slidable for adjustment. Set screws 66 or other clamping devices are carried by the lugs 64 and engage the stem 65. The numeral 67 marks a spreader of conical form, interposed between the end 59 of the pipe 57 and the filter bed 63. At its lower end, the spreader 67 is supplied with an annular flange 69, projecting upwardly, away from the filter bed 63. The spreader 67 is threaded at 68 on the stem 65.

The water flowing from the end 59 of the pipe 57 is received by the spreader 67 and is diverted laterally toward the sides of the body 61 of the filter, the water thus being distributed over the filter bed 63. The downwardly flowing water is received by the flange 67 and is diverted upwardly, away from the filter bed 63. As a result, the filter bed is not scoured out below and adjacent to the spreader 67. The way in which the water is spread by the member 67 depends to some extent on the position which the member 67 occupies with respect to the end 59 of the pipe 57. An approximate vertical adjustmenet of the spreader 67 may be brought about by sliding the stem 65 in the lugs 64, the stem being held in adjusted position by the clamping elements 66. A finer adjustment may be secured by rotating the spreader 67 on the stem 65, it being recalled that the spreader is threaded at 68 to the stem.

A header 70 is located in the filter bed 63 (see Figs. 2 and 5) and is provided with lateral branches 72 having perforations 73, the header being closed at one end as indicated at 71. A pipe 74 leads from the header 70 and is supplied with a valve 78, the pipe discharging into a well 75 communicating with a tank 76. The numeral 79 denotes a main having a valve 80. The water may flow directly from the tank 76 into the main 79, or it may be discharged into the main, through the instrumentality of a pump 77.

The water passes downwardly through the filter bed 63 and enters the header 70 through the branches 72, the water leaving by way of the pipes 74 and flowing into the well 75. The water finds its way into the tank 76, and leaves through the main 79, through the impulse of the pump 77 or otherwise.

A pipe 81 is branched off from the pipe 74 and leads to a sewer 82, a valve 83 being interposed in the pipe 81. The valve 78 may be closed, and the valve 83 may be opened. In order to divert the water from the well 75, and for the further purpose of permitting the operator to observe the condition of the filtered water, at any time.

A pipe 84 is branched off from the pipe 79 and is under the control of a valve 87, the pipe 84 being connected to one end of the header 70. A pipe 85 leads from the pipe 77 to a source 86 of water supply.

The pump 77 may be used to draw water through the pipe 85, the valve 80 being closed, and the valve 87 being open. Under such circumstances, the water may be discharged through the pipe 79 and through the pipe 84 into the header 70, the water traversing the lateral branches 72 of the header 70 and being forced upwardly through the filter bed 63, for the purpose of washing away the impurities which may have collected in the filter bed.

After a washing of the sort above alluded to, or at any other time, the impurities on the top of the filter bed 63 may be drawn off through the instrumentality of a mechanism which will now be described.

A pipe 88 communicates with the sink 49, one end 89 of the pipe upstanding within the body 61 of the filter, as shown in Figure 5 the end 89 of the pipe being supported on a strut 90 and carrying a nipple 91 surrounded at its upper end by and supporting a collar 92 which extends upwardly to the surface of the filter bed 63. A guide 93 is mounted on the body 61 of the filter 58, a tubular gate 94 being mounted to reciprocate in the guide. The lower end of the gate 94 is received slidably within the collar 92 and seats on the upper end of the nipple 91. A bearing 95 is located in the gate 94 adjacent to the upper end thereof, the gate being provided near its lower end with an internal bearing 96. A shaft 97 is mounted to rotate in the bearings 95 and 96. Collars 98 on the shaft 97 cooperate with the bearing 95 to prevent the shaft 97 from moving lengthwise with respect to the gate 94. The shaft 97 is threaded at 99 into a bracket 100 carried by the body 61 of the filter 58, the shaft carrying at its upper end, a hand wheel 101 is above the upper end of the collar 92, and then the sediment on the filter bed 63 will be washed away through the collar 92, the nipple 91 and the pipe 88 into the sink 49.

The operation of the device has been set forth hereinbefore, in connection with the various component mechanisms, and, therefore, a brief résumé of the operation will suffice at this point.

The chemical is mixed in the tank 11 by the agitator 14—15, the agitator being driven from the wheel 8, through which the water passes. The chemical is delivered into the water at the outlet 12 of Figure 3. The water and the chemical enters the receiver 31 and are mixed therein. From the receiver 31, the water flows in a slow surface current, across and through the settling tanks 39 and 52, the water entering the filter 58 over the spreader 67. Having traversed the filter bed 63, the filtered water is selected by the header 70 and its branches 72 and is conducted away by the pipe 74.

Having thus described the invention, what is claimed is:—

1. In a device of the class described, a filter; a conduit leading to the filter; a water motor interposed in the conduit; a chemical tank discharging into the conduit; an agitator in the chemical tank; means for driving the agitator from the motor; and means under the control of the agitator for governing the flow from the tank into the conduit.

2. In a device of the class described, a settling tank; a conduit discharging into the settling tank; a motor interposed in the conduit; a chemical tank discharging into the conduit; an agitator operating in the chemical tank; means for connecting the agitator operatively with the motor; and means under the control of the agitator for regulating the flow from the mixing tank into the conduit.

3. In a device of the class described, a conduit; a water motor interposed in the conduit; a mixing tank discharging into the conduit; a shaft journaled in the tank; a beater carried by the shaft; and means operated by the rotation of the shaft for governing the flow from the tank into the conduit.

4. In a device of the class described, a conduit; a water motor interposed therein; a tank discharging into the conduit; a shaft journaled in the tank; a beater carried by the shaft; means for operatively connecting the shaft with the motor; an arm on the shaft; a plunger slidably mounted on the tank; a valve carried by the plunger and controlling the flow from the tank into the conduit; and a lever fulcrumed on the tank and connected to the plunger, the lever being located in the path of the arm.

5. In a device of the class described, a receiver comprising a shell, a bottom for the shell having a drainage outlet, inner and outer tubular baffles in said shell, the outer baffle being open at both ends and the inner baffle having a bottom, the height of the inner baffle being less than the height of the outer outer baffle, a conduit communicating with the bottom of the inner baffle, a chemical tank discharging into the conduit, a motor interposed in the conduit, an agitator operating in the tank, means for connecting the agitator operatively with the motor, and mechanism under the control of the agitator for governing the flow from the tank into the conduit.

In testimony that I claim the foregoing as my own, I have hereto affixed my signature in the presence of two witnesses.

HARRY W. GIBSON.

Witnesses:
G. B. WOODROW,
LINCOLN SYLVESTER.